United States Patent
Little et al.

(10) Patent No.: US 11,117,521 B2
(45) Date of Patent: Sep. 14, 2021

(54) HEATER PAD, HEATING AND LIGHTING UNIT, REAR VIEW ASSEMBLY AND REAR VIEW MIRROR DEVICE

(71) Applicant: SMR Patents S.à.r.l., Luxembourg (LU)

(72) Inventors: Andrew Brian Little, Portchester (GB); Gottfried Sailer, Stuttgart (DE); Andreas Hermann, Stuttgart (DE); Douglas Wilson, Troy, MI (US); Anthony D'Andreas, Troy, MI (US); Bernd Sülzle, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 285 days.

(21) Appl. No.: 16/247,147

(22) Filed: Jan. 14, 2019

(65) Prior Publication Data

US 2019/0256000 A1 Aug. 22, 2019

Related U.S. Application Data

(63) Continuation-in-part of application No. 15/527,606, filed as application No. PCT/IB2015/058776 on Nov. 13, 2015, now Pat. No. 10,202,078.

(30) Foreign Application Priority Data

Nov. 17, 2014 (DE) .......................... 102014116799.6

(51) Int. Cl.
*G02B 26/08* (2006.01)
*B60R 1/06* (2006.01)
(Continued)

(52) U.S. Cl.
CPC ............ *B60R 1/0602* (2013.01); *B60R 1/072* (2013.01); *B60R 1/1207* (2013.01); *F16F 7/1028* (2013.01); *B60R 2001/1253* (2013.01)

(58) Field of Classification Search
CPC ..... B60R 1/0602; B60R 1/1207; B60R 1/072; B60R 2001/1253; F16F 7/1028; F16F 15/02; F16F 15/002
(Continued)

(56) References Cited

U.S. PATENT DOCUMENTS 6,657,767 B2 12/2003 Bonardi et al.
6,830,351 B2 12/2004 Newcomb
(Continued)

FOREIGN PATENT DOCUMENTS

CN 203402150 U 1/2014
DE 102005055849 A1 5/2007
(Continued)

OTHER PUBLICATIONS

International Search Report dated Jan. 21, 2016, of International application No. PCT/IB2015/058776.

*Primary Examiner* — Euncha P Cherry
(74) *Attorney, Agent, or Firm* — Jones Day (57) ABSTRACT

A rear view assembly for a rear view device of a vehicle includes a rear view element, a carrier plate for the rear view element, and a heating and lighting unit arranged between the rear view element and the carrier plate. The heating and lighting unit may include a light module including a printed circuit board having at least one LED and having no power stripes, and a heater pad. The heater pad may include a circuit or printed circuit board, at least one recess or at least one transparent window, and first contacts or contact elements for contacting a printed circuit board of the light module.

23 Claims, 3 Drawing Sheets

(51) Int. Cl.
*B60R 1/12* (2006.01)
*F16F 7/10* (2006.01)
*B60R 1/072* (2006.01)

(58) Field of Classification Search
USPC ...................................................... 359/217.3
See application file for complete search history.

(56) References Cited

U.S. PATENT DOCUMENTS

| | | | |
|---|---|---|---|
| 6,891,563 B2 | 5/2005 | Schofield et al. | |
| 2002/0171954 A1* | 11/2002 | Bonardi | B60R 1/07 359/877 |
| 2009/0015736 A1* | 1/2009 | Weller | B60R 1/12 349/11 |
| 2011/0260845 A1* | 10/2011 | Henion | B60R 1/08 340/435 |

FOREIGN PATENT DOCUMENTS

| | | |
|---|---|---|
| DE | 102012108592 B3 | 2/2014 |
| EP | 0388988 A1 | 9/1990 |
| EP | 2315495 A1 | 4/2011 |
| EP | 2444283 A2 | 4/2012 |
| FR | 2945246 A1 | 11/2010 |

* cited by examiner

HEATER PAD, HEATING AND LIGHTING UNIT, REAR VIEW ASSEMBLY AND REAR VIEW MIRROR DEVICE

CROSS-REFERENCE TO RELATED APPLICATIONS

This application is a continuation-in-part of U.S. patent application Ser. No. 15/527,606, filed May 17, 2017, which is a National Stage Entry of International Patent Application No. PCT/IB2015/058776, filed Nov. 13, 2015, which claims the benefit of priority to German Patent Application No. 10 2014 116 799.6, filed Nov. 17, 2014, each of which is incorporated by reference herein in its entirety for all purposes.

TECHNICAL FIELD

The following disclosure relates generally to a heater pad, a heating and lighting unit, a rear view assembly and a rear view mirror device.

BACKGROUND

Light modules for rear view mirrors are well known. EP 2 444 283 A2 describes a light module for displaying a signal in a rear view mirror of a motor vehicle including a circuit carrier. At least one light source is disposed on the circuit carrier and a power supply circuit. The power supply circuit is for connecting the circuit carrier to an interface that is disposed away from the circuit carrier and leads to a control unit or a current/voltage source. The power supply circuit and circuit carrier are made of the same material in one piece and formed by a flexible printed circuit board. The known light module is provided with its own contacts at one end of a strip-shaped printed conductor the other end of which connects to the at least one light source on the circuit carrier of the light module. EP 2 444 283 A2 also describes a surface heating film of the rear view mirror which has a recess in the region of a signal display window of the rear view mirror. The circuit carrier can be brought into the window and recess by folding over the strip-shaped printed conductor. This results in a complicated structure.

U.S. Pat. No. 6,657,767 B2 describes a rear view mirror assembly which includes a circuit board positioned behind a mirror. The circuit board may be a flexible circuit board and may include an LED mounted to project light through a transparent window in the flexible circuit board and through the mirror. The flexible circuit board may function as a mirror heater and may include conductive paths for connection to the LED and/or electrodes of an electrochromic mirror. The LED may include an LED chip mounted directly on the circuit board and encapsulated by an encapsulant.

Another automobile rear view mirror heating and indicating lamp structure is described in CN 203402150. The back side of the automobile rear view mirror glass is provided with a heating plate provided with a through hole. An LED indicating lamp plate is embedded in the through hole of the heating plate.

US 2002/0171954 A1 describes a rear view mirror assembly including a circuit board disposed behind a mirror. The circuit board may be a flexible circuit board and may include an LED mounted to project light through a transparent window in the flexible circuit board and through the mirror. The flexible circuit board may function as a mirror heater and may include conductive paths for connection to the LED and/or electrodes of an electrochromic mirror. The LED may include an LED chip mounted directly on the circuit board and encapsulated by an encapsulant.

A method to manufacture an LED is described in US 2002/0171954 A1. In the described method, a first step is described to prepare multiple illuminating devices where each illuminating device has a first contact area and a second contact area. The illuminating devices are mounted on and electrically connected to pairs of corresponding fingers by conductive adhesive. A protective film is coated over the base apparatus to cover the illuminating devices and the connected fingers. The base apparatus is either cut or diced to separate the illuminating devices so that several individual LEDs are completed. When the individual LED is mounted onto a substrate, the LED can be mounted on the substrate by its side so that an entire assembly height of the LED is reduced and is equal to the width of the LED, i.e. the width of the finger. The entire assembly height of the LED is in the range of 50 to 100 micrometers when the LED is mounted on the substrate.

The production of heaters for rear view mirrors is known in the art. EP 2 315 495 A1 describes a process of applying a heater onto a plastic glass substrate by inserting the plastic glass substrate into a sputtering process chamber. Cleaning the surface of the substrate is performed by a dry etching step. A copper target is prepared in a pre-step. EP 2 315 495 A1 also describes sputtering copper onto the surface, removing the layered substrate from the sputtering process chamber, and inscribing tracks onto the layered surface with a laser beam.

DE 10 2012 108 592 B3 describes a rear view mirror that has a disk-shaped reflection unit which has an electrically conductive coating. A holding plate supporting the reflection unit has a recess, and a display unit is fixed in the recess of the holding plate. The display unit has an electronic unit, a lighting unit, and a light guiding body guiding the light of the lighting unit to the reflection unit.

SUMMARY

In one aspect, a heater pad includes a circuit including at least one heating line connectable with a power source and/or a control unit, at least one recess into which a light module is inserted or at least one transparent window for a light emitted by a light module held by the heater pad, and contacts or contact elements for contacting a printed circuit board of the light module. The circuit may be electrically connectable to the printed circuit board of the light module, which has no power stripes, via the contacts. The contacts may be provided in an area overlapping and holding the light module. This heater pad can be made extremely thin so that no plugs for contacts of the light module which is inserted into the recess of the heater pad is needed. Stability may still be provided due to the fact that a region of the heater pad which is partly overlapping the inserted light module to ensure a contact also holds the light module.

The heater pad may include power stripes to be connected to the printed circuit board of the light module.

The heater pad may include further contacts or contact elements for contacting the power source and/or control unit being spaced from the contacts or contact elements to the light module.

A common ground of negative polarity may travels down a single path to a single contact or contact element.

The recess may include a through hole and the area may be in form of an extension or shoulder next to the recess.

A heating and lighting unit may be provided which include a heater pad and a light module having a flexible printed circuit board with at least one LED and having no power stripes. The light module may be inserted into the recess of the heater pad, or the light module may be held by the heater pad adjacent to at least one transparent window for a light emitted by the light module. The printed circuit board of the light module may be electrically connected to the circuit of the heater pad.

The thickness of the light module may correspond to the thickness of the heater pad, and/or the thickness of the light module may be below 1 mm, below 0.8 mm, and/or the light module may not extend beyond the heater pad.

The light module may have no power stripes, and/or the light module may be connected to a remote power source and/or a control unit via the heater pad.

In another aspect, a rear view assembly for a rear view device of a vehicle includes a reflective element, a carrier plate for the reflective element, and a heating and lighting unit with the heating and lighting unit being arranged between the reflective element and the carrier plate.

The reflective element may include a glass carrying a reflective layer within a mirror region with the reflective layer being at least partly removed or spared out in at least one display region overlapping the light module so that light from the light module can shine through the reflective element within the display region.

The heater pad may adhere to at least one of the back side of the glass and the front side of the carrier plate with the back side and the front side facing each other.

An icon may be included in the display region provided by either the reflective layer or another layer. The icon may be a paint on the glass and/or a diffuser in the display region provided by another layer, such as another paint on the glass, with the glass surface on the side of the light module carrying the icon layer and the icon layer carrying the diffuser layer.

The heating and lighting unit may be held between the reflective element and the carrier plate with both the reflective element and the carrier plate being substantially flat and having the substantially flat heating and lighting unit arranged in between without any recess for the light module.

In another aspect, a rear view device for a vehicle includes a rear view assembly of the invention with an electrical connection of the heating and lighting unit to a power source and/or control unit arranged within the vehicle.

The contacts or contact elements for the light module may be positioned outboard or remote from the vehicle connection position of the rear view device, and further contacts or contact elements for contacting the power source and/or control unit may be positioned inboard or adjacent to the vehicle connection position of the rear view device.

The rear view device may include at least one additional electronic component connected to the power source and/or the control unit via the heater pad.

The contacts or contact elements to the additional electronic component may be arranged adjacent to the contacts or contact elements for the light module.

The rear view device may include a very thin heating and lighting unit by omission of any power stripes on the light module or printed circuit board. A flexible printed circuit board for the light module may be used to facilitate inserting the light module into a heater pad to form the heating and lighting unit. The heater pad may be provided with a hole for the insertion of the light module and contacts for contacting the flexible printed circuit board of the light module. Via the heater pad, the light module may be provided with power as well as control signals from a respective power source and/or control unit which can be arranged at a distance, and the heater pad may be provided with power stripes and/or an interface for a respective connection.

The thickness of the heating and lighting unit may be about 1 mm or below 0.8 mm. This facilitates the placement of the unit in a rear view assembly. The unit may be a substantially flat layer which can be arranged between a reflective element and a carrier plate of the rear view assembly. The carrier plate does not have to be provided with any box, hole or the like to house the light module, which may reduce production time and costs.

The multi-circuit nature of the heater pad may reduce the size and amount of parts needed so that the overall complexity is reduced and manufacturing costs can be reduced. The heater pad may be capable of having one circuit known as a common ground where the ground (negative plurality) of all the electrical components connected to the heater pad, including a light module, travels down a single path to a single contact element/terminal. As a result, only one wire for the ground going to the heater pad may be used for all the electrical components connected therewith.

The reflective element of the rear view assembly may be provided by a glass, which may be a plastic glass, provided with an icon and a diffuser in a display region to provide information and/or signals. Outside the display region, the glass may be provided with a reflective layer to act as a mirror. The icon may be provided by a paint. Also the diffuser may be provided by a paint in order to reduce the overall thickness of the rear view assembly.

The heater pad may be adhered to the back side of the glass as well as a carrier plate thereof. The rear view assembly may be of use within a rear view device for a vehicle, with the display region serving to provide a driver of the vehicle with drive assistant signals like informing the driver of other vehicles approaching within a blind zone.

Assembling a rear view device may be further facilitated by defining the locations of the wires to be connected to the heater pad. For example, the contacts/contact elements supplying the heater pad with signals and/or power may be arranged on one side such as the inboard side of the rear view device. The electrical contacts/contact elements to all electrical components connected to the heater pad, including a light module, may be arranged on another side such as the inboard of the rear view device.

An additional electrical component may be installed for dampening vibrations.

A control or regulating device may control or regulate a motor via an energizing process of the motor depending on at least one variable, which is selected from a first detected variable and/or at least one second stored variable, during a driving process in order to counteract movements of the at least one rear view element relative to a housing by adjusting the motor. The movements may be caused by the movements of the motor vehicle during the driving process of the motor vehicle.

The at least one rear view element may include a mirror element and/or an image acquisition element, such as a camera, where the image acquisition element acts as a mirror replacement element.

The first detected variable may be detected via a sensing device, determined via the driving process of the motor vehicle, the speed of the motor vehicle, the engine speed of the motor vehicle motor, the lane of the motor vehicle, a weather variable such as a wind force during the driving process, and/or at least one obstacle which is to be avoided.

The second stored variable may originate from a storage device in the rear view device, the motor vehicle or, a mobile unit, and/or the second stored variable may be determined via a map.

The control or regulating device may adjust the energizing process via current pulses with frequency-dependent pole reversal or the current intensity of a permanent current.

The adjusting drive may include two motors in order to adjust the field of view and to dampen vibrations.

In another aspect, a shock absorbing device may be provided for the at least one rear view element in operative connection with the control or regulating device, each motor, the sensing device and/or the storage device.

Rear view devices may be characterized in that the mirror element may cover a first viewing zone and the image acquisition element may cover a second viewing zone. Two mirror elements or two image acquisition elements may be provided for a first and a second viewing zone. The first viewing zone may include a near viewing zone and the second viewing zone may include a distance viewing zone.

The housing may include a first housing element and a second housing element which can be moved or folded relative thereto. The at least one rear view element may be arranged in the second housing element and the first housing element may be mounted on the motor vehicle.

A pivoting device may be arranged between the first and the second housing element, and may be in operative connection with the control or regulating device, each motor, the sensing device, the storage device, and/or the impact absorbing device.

Vibration damping and stabilization of a mirror glass element of a car's external mirror may be effected via the adjusting drives/glass adjusters (usually available on the automotive supply market) with two drive motors which are typically used exclusively for adjusting the field of view. These drive motors may be allocated the additional function of substantially compensating in full for movements/oscillations during the driving process by means of a specific energizing process. The energizing process may be intelligently adjusted depending on the speed of the car, the engine speed of the car motor, the lane along which the car is moving during the driving process, and/or the weather conditions during the driving process. Recourse can be had to GPS information regarding curves, gradients, and the like during the lane determination. The same applies to weather information.

Vibration damping of an image acquisition element, which acts as a mirror replacement element and which can also be described as a virtual mirror element, may be used instead of a mirror (glass) element or in addition to the vibration damping of the mirror (glass) element. Such other uses increases the range of application and flexibility.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein.

DETAILED DESCRIPTION

It is to be understood that the disclosure is not limited in its application to the details of construction and to the arrangements of the components set forth in the following description or illustrated in the drawings. The Figures and written description are provided to teach those skilled in the art to make and use the inventions for which patent protection is sought. The disclosure is capable of other embodiments and of being practiced and carried out in various ways. Those skilled in the art will appreciate that not all features of a commercial embodiment are shown for the sake of clarity and understanding. Those skilled in the art will also appreciate that the development of an actual commercial embodiment incorporating aspects of the present disclosure may require numerous implementation-specific decisions to achieve the developer's ultimate goal for the commercial embodiment.

In addition, it is to be understood that the phraseology and terminology employed herein are for the purpose of describing the present disclosure and should not be regarded as limiting. For example, the use of a singular term, such as, "a" is not intended as limiting of the number of items. Also, the use of relational terms, such as but not limited to, "top," "bottom," "left," "right," "upper," "lower," "down," "up," "side," are used in the description for clarity in specific reference to the Figures and are not intended to limit the scope of the present disclosure. Further, it should be understood that any one of the features may be used separately or in combination with other features. Other systems, methods, features, and advantages will be or become apparent to those skilled in the art upon examination of the Figures and the description. The term "driver" is used throughout this disclosure but is not limited to a person who is operating or controlling the vehicle; it may refer to any vehicle occupant, person, passenger, or user inside the vehicle, or, in certain circumstances, a person who is outside the vehicle but controlling the vehicle or interested in movement of the vehicle. It is intended that all such additional systems, methods, features, and advantages be included within this description, and be within the scope of the present disclosure.

Figure 5:
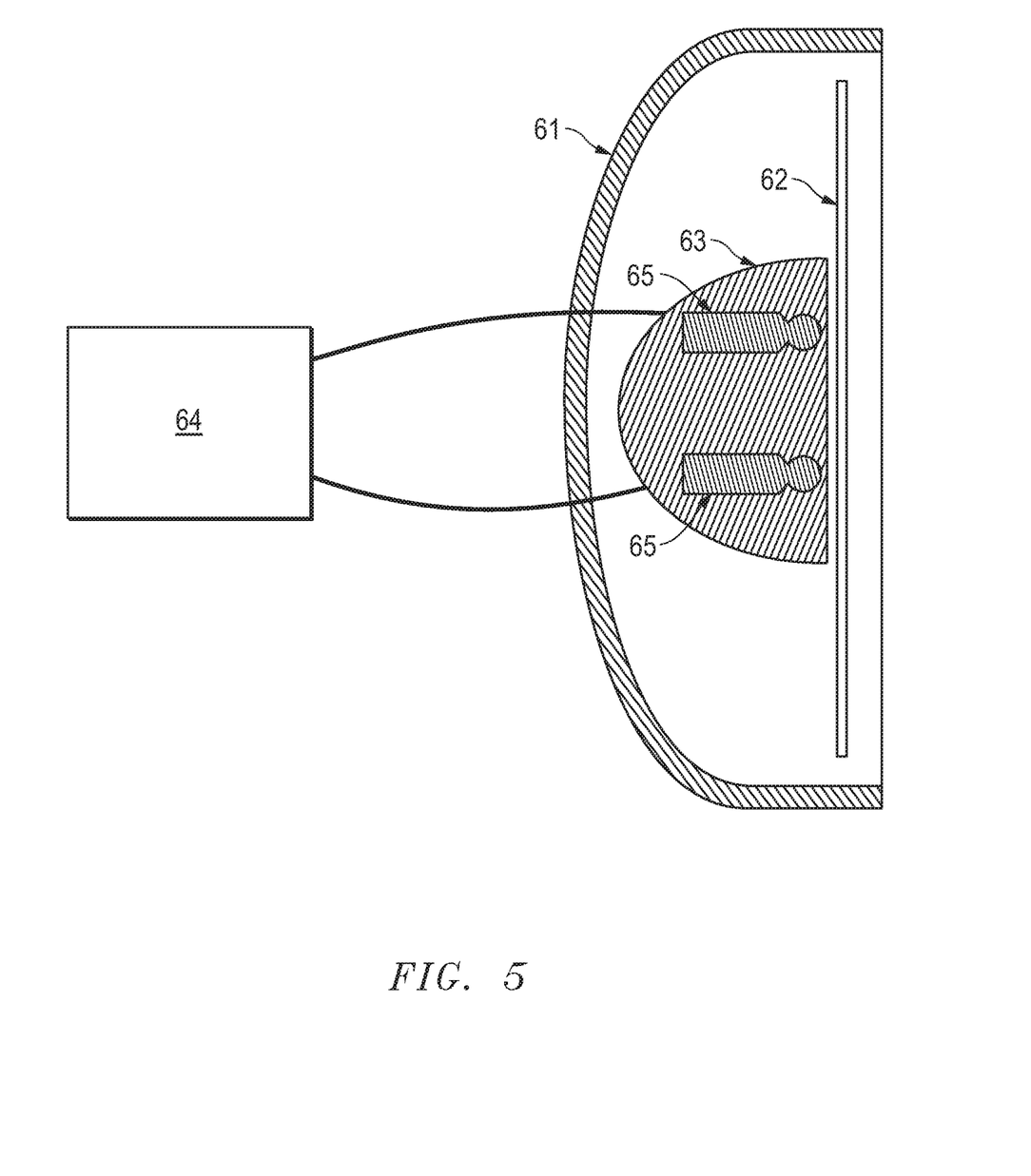
FIG. 5 is a cross-sectional view of a further example of a rear view device.

FIG. 5 is a cross-sectional view of an example of a rear view device. The exterior rear view device includes a moveable rear view assembly 62 which may be heated. The moveable rear view assembly 62 is moveable in the sense that the driver of the vehicle can adjust the position of the rear view assembly 62, for example, via a remote switch that controls an electric actuator 63. The electric actuator 63 may be capable of tilting the rear view assembly 62 in both the up/down and in/out directions to provide the driver with an optimized view rear and/or sideward of the vehicle. The rear view assembly 62 may also contains other electrical features such as a turn signal, a warning indicator, a blind spot indicator, a dimming feature, an auxiliary piece of glass that is also heated, or some other electrical component. Typically these other electrical features are located in various other areas of the rear view assembly 62. Difficulty arises when wires for all these electrical features need to be routed from a housing of the rear view device to the rear view assembly. Multiple wires leading to multiple locations on the rear view assembly 62 may hamper and possibly restrict the movement of the rear view assembly 62 when it is being remotely adjusted. Some glass assemblies 62 may contain four, six or even eight wires connected to the glass assembly 62.

Figure 1:
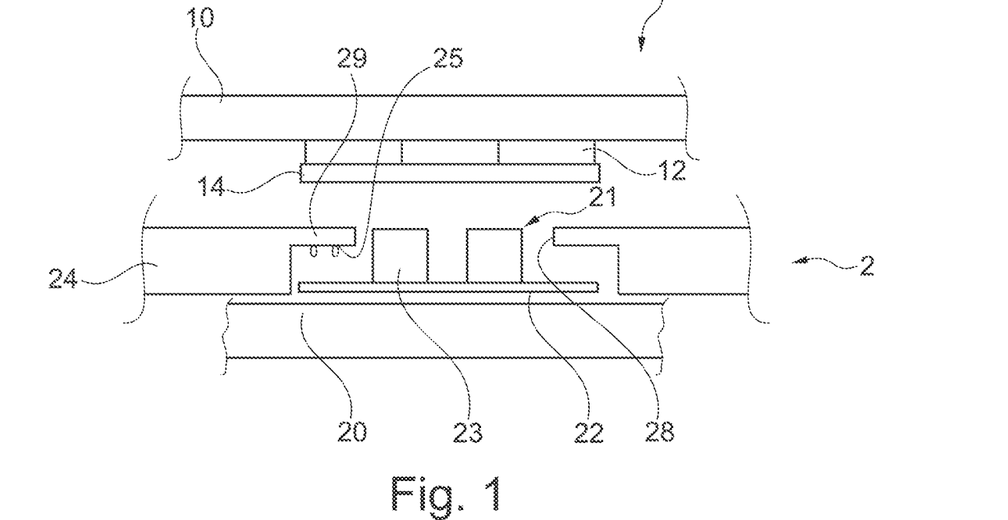
FIG. 1 is a cross-sectional view of an example of a rear view assembly of a rear view device.

FIG. 1 is a cross-sectional view of another example of a rear view assembly 1 of a rear view device. The rear view assembly 1 may include a heating and lighting unit 2 packed between a glass 10 and its carrier plate 20. The glass 10 as well as the carrier plate 20 can have a disc form without being provided with any recess to house at least a part of the heating and lighting unit 2.

The glass 10, which can be a plastic glass, may have two regions. For example, a mirror region which carries a reflective layer (not shown) and a display region which carries an icon 12 and a diffuser 14. Both the icon 12 and the diffuser 14 can be provided by paint in order reduce the overall thickness.

The heating and lighting unit 2 may include a light module 21 arranged with a heater pad 24. The light module 21 may include a flexible printed circuit board 22 for two LEDs 23, but no power stripes. The light module 21 rather makes usage of the power stripes of the heater pad 24 which is connected therewith via contacts 25. This is possible because the light module 21 is arranged within recess 28 of the heater pad 24 having shoulders 29 overlapping the light module 21 in the region of the printed circuit board 22.

The LEDs 23 of the light module 21 may be arranged in the display region of the rear view assembly 1 so that the light emitted by the LEDs 23 can pass the diffuser 14, the icon 12 and the glass 10 in order to provide signals on the surface of the glass 10. The diffuser 24 may ensure a homogenous illumination of the display region.

Figure 2:
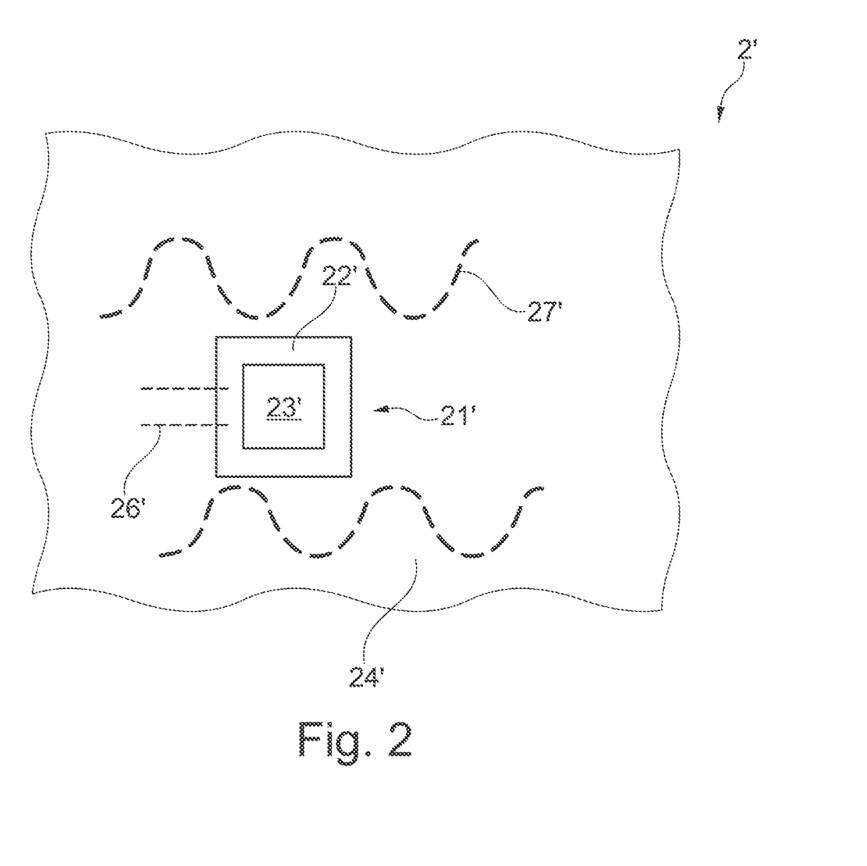
FIG. 2 is a partial cut away view of a heating and lighting unit of a rear view assembly of another example of a rear view device.

FIG. 2 is a partial cut away view of a heating and lighting unit of a rear view assembly of another example of a rear view device.

Referring to FIG. 2, a heating and lighting unit 2' of a rear view assembly is illustrated. The rear view assembly may include a heater pad 24' having a circuit including heater lines 27' and power stripes 26'. The power stripes 26' may be electrically connected to a flexible printed circuit board 22' of a light module 21'. The printed circuit board 22' may carry an LED 23'.

The heating and lighting unit 2, 2' may be arranged within a rear view assembly 1 to be used for an exterior rear view device for providing drive assistance.

Figure 3:
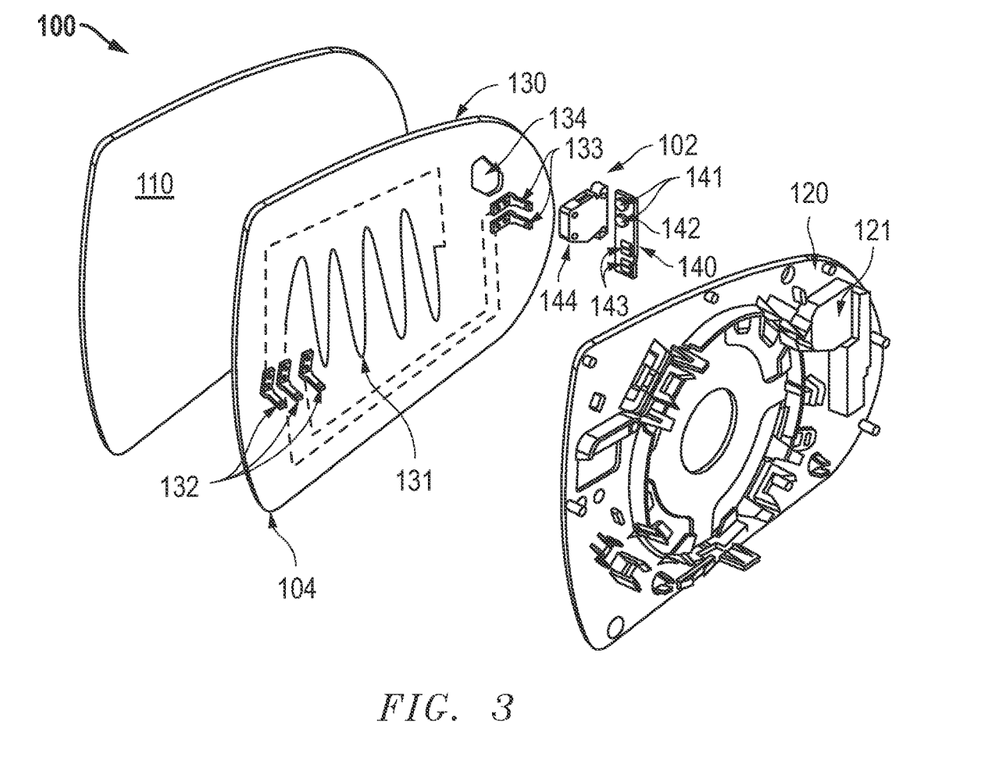
FIG. 3 is an exploded view of a further example of a rear view assembly.
Figure 4:
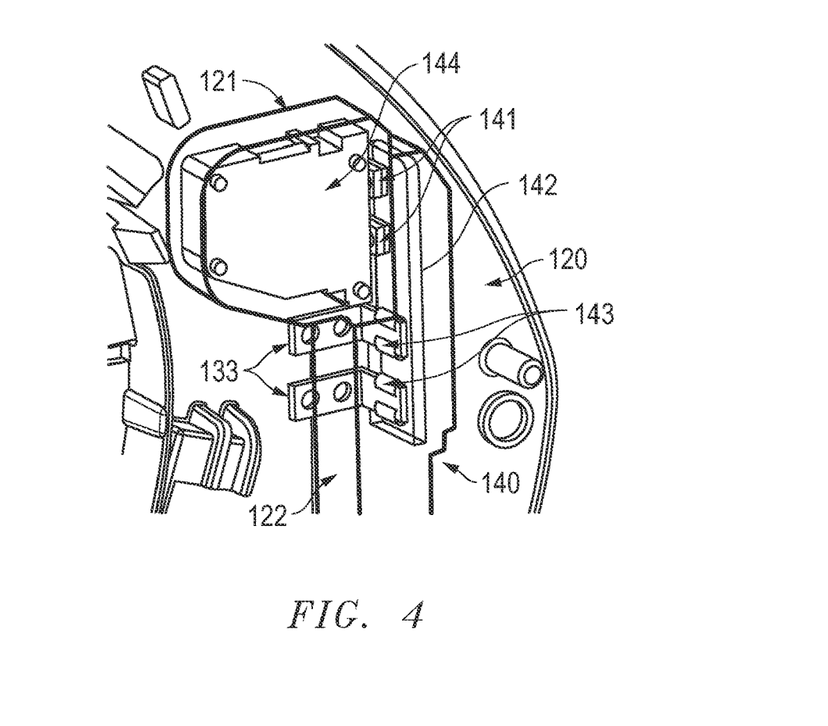
FIG. 4 is a perspective view of a part of the assembled rear view assembly of FIG. 3.

FIG. 3 is an exploded view of a further example of a rear view assembly. FIG. 4 is a perspective view of a part of the assembled rear view assembly of FIG. 3.

Referring to FIGS. 3 and 4, a third rear view assembly 100 includes a heating and lighting unit 102 including a heater pad 104 with a light module 140 between a mirror glass 110 and a carrier plate 120.

In this example, the heater pad 104 includes a printed circuit board 130 with a heater line 131 and contact elements 132 at an inboard position of the rear view device into which the rear view assembly 100 is configured to be mounted as well as second contact elements 133 at an outboard side of the rear view assembly when mounted to the rear view device. The second contact elements 133 serve to contact the light module 140 in order to provide power to LEDs 141 carried by a printed circuit board 142. A light guide 144 may be attached to the circuit board 142 with the LEDs 141 such that the light emitted by the LEDs 141 enters into the light guide 144 and exits through the light guide 144 to pass a transparent window. The transparent window may be an opening 134 within the printed circuit board 130 which allows light to shine through the glass 110 to function as a blind spot indicator. With respect to the light paths reference is made to US patent application publication nos. 2016/209000, US 2018/195687 and US 2018/340673, each of which is hereby incorporated by reference in its entirety for all purposes.

The light module 140 may be provided without its own stripes and may be held by the heater pad 104 via the second electrical contacts 133 attached to mounting elements 143 of the light module 140. The heater pad 104 may be adhered to the back side of the glass 110 on the one side and to the front side of the carrier plate 120 on the other side. The carrier plate 120 may be provided with a housing 121 for the light module 140, as illustrate in FIG. 4.

In an example, all wires leading to the rear view assembly may connect to lugs, terminals, or the contact elements 132 on the heater pad 104 in one optimized area. This area may be located on the inboard side of the rear view assembly 100 to provide the greatest package space. One of the wires going to the rear view assembly 100 may be a common ground return wire which provides a single return wire for all the electrical components contained on the rear view assembly 100. This arrangement reduces the overall number of wires going to the rear view assembly 100.

The other wire(s) going to the rear view assembly 100 may provide(s) the positive feed for the various electrical features. Mating connector lugs such as contact elements 132 for all the wires leading to the rear view assembly 100 may be integral to the heater pad 104 and contained within the rear view assembly 100. Thus, two leads may be provided from one location to provide continuity for the heater pad 104 by providing the heater line 131. Also, from the same area and integral to the heater pad 104, one positive feed and one negative return may extend to the location of each electrical component contained within the rear view assembly 100. A secondary set of lugs such as contact element 133 may be located at the location of each electrical component for connecting to other electrical components. To provide a feed and return for the additional electrical components, "conductive traces" may be included in the heater element that allow electrical current to travel from the optimized entry connection point to the location of the electrical device. These traces may be insulated and laminated on top of the heater pad 104 heated area, or may be located outside of the heated area of the heater pad 104.

FIG. 5 is a cross-sectional view of a further example of a rear view device. Referring to FIG. 5, a rear view device includes a mirror housing 61 which is fixed to a vehicle (not shown), in which a mirror glass 62 can be adjusted relative to the mirror housing 61 via a glass adjusting drive 63. For this purpose, two drive motors 65 can be adjusted via control electronics 64. The control electronics 64 may be electrically connected to the drive motors 65 via a printed circuit board provided by a heater pad (not shown). The arrangement of the heater pad and the structure may be arranged as illustrated in FIG. 3 with third contact elements being provided next to the contact elements 133 on the header pad for the drive motors 65.

In an example, the drive motors 65 may be used to set the field of view for a driver or passenger of the vehicle. In another example, the drive motors 65 may serve to stabilize the mirror glass 62. A specific speed-dependent or engine speed-dependent energizing process of the two drive motors 65 may be used via the regulating or control electronics 64 to dampen the movement and/or vibration of the mirror glass 62 during the driving process of the vehicle without adjusting the field of view. The energizing process of the two drive motors 65 can be carried out by current pulses with frequency-dependent pole reversal or by means of a permanent current which is limited in terms of its current intensity so that the set field of view is not adjusted. A mirror image produced on the mirror glass 62 may be free of vibrations as perceived by the human eye.

In once aspect, an active damping of the mirror glass 62 can be achieved with active components which exist in the glass adjusting drive 63 without additional active or passive components being mounted on mirror components.

It will be appreciated by those skilled in the art that changes could be made to the embodiments described above without departing from the broad inventive concept thereof. It is understood, therefore, that the present disclosure disclosed herein is not limited to the particular embodiments disclosed, and it is intended to cover modifications within the spirit and scope of the present disclosure.

REFERENCE SIGNS 1 rear view assembly
2, 2' heating and lighting unit
10 glass
12 icon
14 diffusor
20 carrier plate
21, 21' light module
22, 22' printed circuit board
23, 23' LED
24, 24' heater pad
25 contact
26' power stripe
27' heater line
28 recess
29 shoulder
61 mirror housing
62 mirror glass
63 glass adjusting drive
64 regulating electronics
65 drive motor
100 rear view assembly
102 heating and lighting unit
104 heater pad
110 glass
120 carrier plate
121 housing
122 contact element
130 printed circuit board
131 heater line
132 contact element
133 contact element
134 opening
140 light module
141 LED
142 printed circuit board
143 mounting element
144 light guide

What is claimed is:

1. An exterior rear view assembly for a rear view device of a vehicle, comprising:
   An exterior rear view element;
   a carrier plate for the rear view element; and
   a heating and lighting unit arranged between the rear view element and the carrier plate, the heating and lighting unit comprising:
      a light module comprising a printed circuit board having at least one LED and having no power stripes; and
      a heater pad, which is configured to generate heat, comprising:
         a circuit or printed circuit board comprising at least one heating line and being connectable with at least one of a power source and a control unit;
         at least one recess into which the light module is configured to be inserted, or at least one transparent window for light emitted by the light module held by the heater pad; and
         first contacts or contact elements for contacting a printed circuit board of the light module,
      wherein the circuit or printed circuit board is electrically connectable to the printed circuit board of the light module via the first contacts or contact elements which are provided in an area overlapping and holding the light module and arranged within the circumference of the heater pad on the side of the heater pad facing the carrier plate.

2. The rear view assembly according to claim 1, wherein the heater pad comprises power stripes to be connected to the printed circuit board of the light module.

3. The rear view assembly according to claim 1, wherein the heater pad comprises second contacts or contact elements for contacting at least one of the power source and control unit being spaced from the first contacts or contact elements to the light module.

4. The rear view assembly according to claim 1, wherein a common ground or negative polarity travels along a single path on the heater pad to a single second contact or contact element.

5. The rear view assembly according to claim 1, wherein the recess of the heater pad comprises a through hole, and the area next to the recess includes an extension or shoulder, or the light module is arranged adjacent to the transparent window of the heater pad.

6. The rear view assembly according to claim 1, wherein the printed circuit board is flexible.

7. The rear view assembly according to claim 1, wherein the thickness of the light module corresponds to the thickness of the heater pad, or the thickness of the light module is less than 1 mm.

8. The rear view assembly according to claim 1, wherein the light module does not extend beyond the heater pad.

9. The rear view assembly according to claim 1, wherein the light module is connected to at least one of a remote power source and a control unit via the heater pad.

10. The rear view assembly according to claim 1, wherein separate wires are connected to at least one of the first contacts or contact elements of the heater pad and second contacts or contact elements of the heater pad.

11. The rear view assembly according to claim 1, wherein the rear view element comprises at least one of
    a reflective element with a glass carrying a reflective layer within a mirror region; and
    a display element which can provide a reflective layer effect.

12. The rear view assembly according to claim 1, wherein the heater pad is adhered to the back side of the rear view element.

13. The rear view assembly according to claim 11, wherein a part of the rear view element is at least partly removed or spared out in at least one display region overlapping the light module so such that light from the light module is configured to shine through the reflective element within the display region.

14. The rear view assembly according to claim 13, further comprising at least one of
an icon in the display region provided by either the reflective layer or a further layer on the glass, and
a diffuser in the display region provided by another layer on the glass.

15. The rear view assembly according to claim 14, wherein the glass surface on the side of the light module carries the icon layer and the icon layer carries the diffuser layer, and at least one of the further layer and the another layer is a paint.

16. The rear view assembly according to claim 1, wherein the heating and lighting unit is held between the rear view element and the carrier plate.

17. The rear view assembly according to claim 16, wherein the rear view element, the carrier plate, and the heating and lighting unit are substantially flat, the heating and lighting element being arranged between the rear view element and the carrier plate without any recess for the light module being provided by the carrier plate.

18. The rear view assembly according to claim 1, further comprising an adjusting drive for vibration dampening of the rear view element,
wherein the adjusting drive comprises at least one motor which is configured to be adjusted via a control or regulating device or the control unit in order to adjust the field of view of the rear view element, and the motor is connected to the control or regulating device via the heater pad.

19. The rear view assembly according to claim 18, wherein the heater pad further comprises at least a third contact or contact element for contacting the motor, the third contact or contact element being arranged adjacent to the first contacts or contact elements.

20. A rear view device for a vehicle comprising the rear view assembly of claim 1, the rear view device comprising an electrical connection of the heating and lighting unit to at least one of a power source and a control unit.

21. The rear view device according to claim 20, wherein
the first contacts or contact elements for the light module are positioned outboard or remote from the vehicle connection position of the rear view device, and
second contacts or contact elements for contacting at least one of the power source and control unit are positioned inboard or adjacent to the vehicle connection position of the rear view device.

22. The rear view device according to claim 20, further comprising at least one additional electrical component, the additional electrical component comprising at last one of a further light module and an adjusting drive which is connected to at least one of the power source and the control unit via the heater pad and third contacts or contact elements.

23. The rear view device according to claim 22, wherein the third contacts or contact elements for the additional electrical component are arranged adjacent to the first contacts or contact elements for the light module.

\* \* \* \* \*